(No Model.)

W. E. MOFFITT.
ATTACHMENT FOR DISK HARROWS.

No. 467,182. Patented Jan. 19, 1892.

Witnesses
Will T. Norton
H. S. Rohrer

Inventor
William E. Moffitt
By his Attorney
Parker H. Sweet Jr.

UNITED STATES PATENT OFFICE.

WILLIAM E. MOFFITT, OF PILOT POINT, TEXAS.

ATTACHMENT FOR DISK HARROWS.

SPECIFICATION forming part of Letters Patent No. 467,182, dated January 19, 1892.

Application filed June 10, 1889. Serial No. 313,772. (No model.)

*To all whom it may concern:*

Be it known that I, WILLIAM E. MOFFITT, a citizen of the United States, and a resident of Pilot Point, in the county of Denton and State of Texas, have invented new and useful Improvements in Attachments for Disk Harrows; and I do hereby declare the following to be a full, clear, and exact description of said invention, reference being had to the accompanying drawings, and to the letters of reference marked thereon, which form a part of this specification.

This invention relates to improvements in disk harrows.

The object of the invention is to prevent the rising or upward bulging of the inner or adjacent ends of the gangs or disk-bearing sections caused by the side pressure of the soil on the disks, the said upward movement of the inner ends of the gangs interfering materially with the proper and satisfactory operation of those disks which are located near the center of the harrow; and, furthermore, the object of the invention is to provide means to allow the uprising of the outer ends of the gangs or disk-bearing sections to enable the inner ends thereof to sink into depressions in the surface of the soil.

With these objects in view the invention consists, essentially, in a truss-frame designed to be connected at its center to the inner or adjacent ends of the gangs and at its extremities to the outer ends of the same; and, furthermore, the invention consists in providing flexible connections between the extremities of the truss-frame and the outer portions of the gangs.

Figure 1:
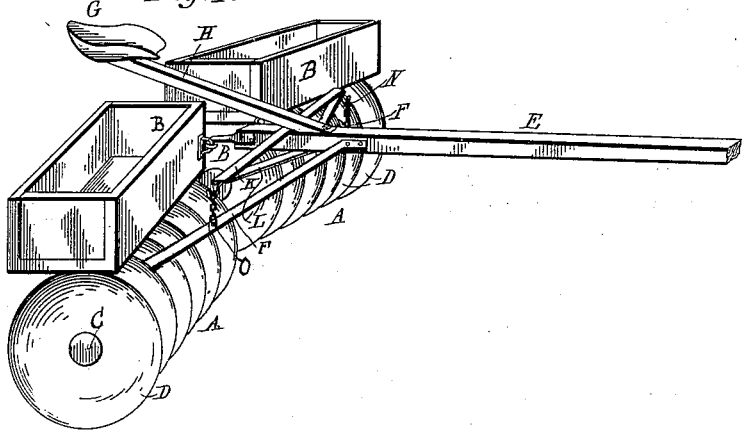
Figure 2:
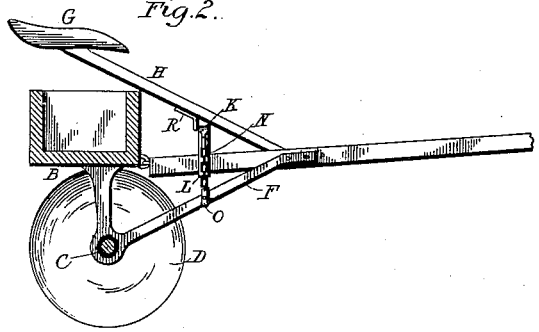
Figure 3:
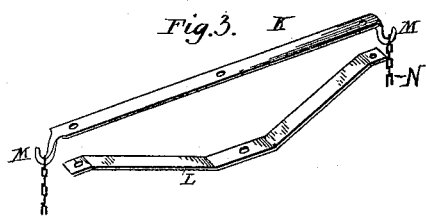

In the accompanying drawings, forming part of this specification, and in which like letters of reference designate corresponding parts, Figure 1 is a perspective view of a harrow provided with a truss attachment constructed in accordance with this invention. Fig. 2 is a central vertical sectional view, and Fig. 3 is detail perspective view, of the truss-frame with its parts separated.

Referring by letter to the drawings, A A designate the gangs or disk-bearing sections, having the gang frames or planks B B and the horizontal shafts C C, carrying the disks D.

E designates the tongue, which is connected at its rear end to the adjacent ends of the gang frames or planks.

F F designate the rearwardly-divergent side draft-bars, which are connected at their front ends to the tongue and at their rear ends flexibly to the shafts C C, and G designates the seat, having the rearwardly-inclined seat-bar H, which is secured at its lower end to the tongue.

The truss-frame consists of a horizontal upper bar K, which is bolted at its extremities to the ends of the downwardly-bowed lower bar L, the said lower bar being bolted at its center to the under side of the tongue near its connection with the gang-frames. The ends of the upper bar of the truss-frame are formed into hooks M M, to which are attached the upper ends of the chains or flexible hangers N N, and the lower ends of these chains or hangers are provided with hook-shaped couplings O O, which engage under the draft-bars F F close to their connection to the shafts C C. The upward strain on the inner ends of the gangs is resisted by the center of the truss, inasmuch as the outer ends of the former are upheld and prevented by the chains or hangers from sagging, whereas the flexibility of said chains or hangers allows the outer ends of the gangs to rise and the inner ends thereof to sink to accommodate irregularities of the surface over which the harrow passes.

I have shown and described my attachment as applied to a harrow of the ordinary construction, and desire it to be understood that its usefulness is not limited to any particular form of harrow, but extends to all forms having an equivalent construction.

By the peculiar construction and arrangement of the device all upward bulging of the center of the harrow is prevented, whereas downward movement is permitted, thus overcoming the principal defect of machines of this class.

Having thus described my invention, what I claim, and desire to secure by Letters Patent of the United States, is—

1. An attachment for disk harrows, consisting of a truss-frame adapted to be connected at its center to the inner or adjacent ends of the disk-bearing sections and at its extremities to the outer ends of said sections, whereby the upward bulging of the inner ends of the latter is prevented, substantially as specified.

2. An attachment for disk harrows, consisting of a truss-frame connected at its center to the inner or adjacent ends of the disk-bearing sections and provided at its extremities with flexible hangers which are connected to the outer ends of the said sections, whereby the upward bulging of the inner ends of the latter is prevented and the rising of the outer ends thereof is permitted, substantially as and for the purpose specified.

3. The combination, with a disk harrow, of the truss-frame secured at its center to the tongue or draft-frame, and the chains or flexible hangers depending from the extremities of the truss-frame and connected at their lower ends to the side draft-bars adjacent to the disk-bearing sections, substantially as and for the purpose specified.

4. The combination, with a disk harrow having a tongue connected to the inner or adjacent ends of the disk-bearing sections and side draft-bars connected to the outer ends of the said sections, of the truss-frame comprising the downwardly-bowed lower bar, which is affixed to the tongue, and an upper bar connecting the extremities of the lower bar, and the chains or flexible hangers depending from the extremities of the truss-frame and connected at their lower ends to the side draft-bars adjacent to the disk-bearing sections, substantially as and for the purpose specified.

In testimony whereof I affix my signature in presence of two subscribing witnesses.

WILLIAM E. MOFFITT.

Witnesses:
L. W. BENNETT,
GEO. W. HALL.